(12) United States Patent
Chen et al.

(10) Patent No.: US 12,081,006 B2
(45) Date of Patent: Sep. 3, 2024

(54) JUNCTION BOX MOUNTED TO BE FLUSH WITH WALL SURFACE AND CONVENIENT FOR LINE REPAIR

(71) Applicant: Jiangsu Barep Smart Technology Co., Ltd, Zhangjiagang (CN)

(72) Inventors: Jiangang Chen, Zhangjiagang (CN); Xiaobo Zheng, Zhangjiagang (CN)

(73) Assignee: Jiangsu Barep Smart Technology Co., Ltd, Zhangjiagang (CN)

( * ) Notice: Subject to any disclaimer, the term of this patent is extended or adjusted under 35 U.S.C. 154(b) by 213 days.

(21) Appl. No.: 17/839,508

(22) Filed: Jun. 14, 2022

(65) Prior Publication Data

US 2022/0311228 A1    Sep. 29, 2022

(30) Foreign Application Priority Data

May 30, 2022    (CN) .......................... 202210596824.4

(51) Int. Cl.
*H02G 3/08* (2006.01)
*H02G 3/12* (2006.01)

(52) U.S. Cl.
CPC .............. *H02G 3/12* (2013.01); *H02G 3/081* (2013.01)

(58) Field of Classification Search
CPC .......... H02G 3/08; H02G 3/081; H02G 3/085; H02G 3/12; H02G 3/121; H02G 3/123; H02G 3/086; H02G 3/10; H05K 5/00; H05K 5/02; H05K 5/0247; H05K 5/0217; H05K 5/03; H01R 13/46

USPC ....... 174/480, 481, 50, 53, 57, 58, 502, 486; 220/3.2–3.9, 4.02; 361/600, 601, 679.01
See application file for complete search history.

(56) References Cited

U.S. PATENT DOCUMENTS

| | | | | |
|---|---|---|---|---|
| 4,591,658 A * | 5/1986 | Bauer | ................... | H02G 3/065 174/661 |
| 4,605,816 A * | 8/1986 | Jorgensen | .............. | H02G 3/083 174/661 |
| 6,423,897 B1 * | 7/2002 | Roesch | ................... | H02G 3/086 174/53 |
| 6,576,835 B1 * | 6/2003 | Ford | ...................... | H02G 3/086 174/53 |
| 6,642,447 B1 * | 11/2003 | Mailloux | ............... | H02G 3/081 361/600 |
| 7,207,830 B2 * | 4/2007 | Conway | ................... | H02G 3/08 361/42 |
| 7,667,145 B2 * | 2/2010 | Dinh | ....................... | H02G 3/14 174/53 |
| 8,446,737 B1 * | 5/2013 | Tschirpke | .............. | H04R 1/025 361/752 |
| 8,569,619 B2 * | 10/2013 | Gretz | ...................... | H02G 3/121 174/58 |

(Continued)

*Primary Examiner* — Angel R Estrada
(74) *Attorney, Agent, or Firm* — Zhigang Ma

(57) ABSTRACT

The present disclosure discloses a junction box mounted to be flush with a wall surface and convenient for line repair, and belongs to the technical field of junction boxes. The junction box includes a junction box body and a flip cover body. A top surface of one part of the junction box body sinks to form a step surface; the step surface extends to an edge of the junction box body; the flip cover body is hinged to a first end of the junction box body; the flip cover body is clamped on the junction box body; and the flip cover body is fitted to the step surface and presses against a second end of the junction box body.

6 Claims, 4 Drawing Sheets

(56) References Cited

U.S. PATENT DOCUMENTS

| | | | |
|---|---|---|---|
| 8,962,997 B2* | 2/2015 | Conway | H02G 3/081 174/59 |
| 10,278,301 B2* | 4/2019 | Bahl | H05K 5/0247 |
| 10,888,007 B1* | 1/2021 | Bahl | H02G 3/081 |
| 11,881,695 B2* | 1/2024 | Crook | H02G 15/24 |
| 2011/0061930 A1 | 3/2011 | Kazi et al. | |
| 2013/0010450 A1 | 1/2013 | Xiao et al. | |
| 2014/0311793 A1 | 10/2014 | Kaneko et al. | |

* cited by examiner

JUNCTION BOX MOUNTED TO BE FLUSH WITH WALL SURFACE AND CONVENIENT FOR LINE REPAIR

TECHNICAL FIELD

The present disclosure belongs to the technical field of junction boxes, and particularly relates to a junction box mounted to be flush with a wall surface and convenient for line repair.

BACKGROUND

A junction box is one of electrical accessories. A wire for decoration passes through a wire tube. If a line is long or the wire tube needs to be cornered, a junction box is used at a connection part of the wire for transitioning. The wire tube is connected to the junction box. The wire inside the wire tube is connected in the junction box to play a role of protecting and connecting the wire.

Chinese patent (CN202122719595.4) discloses a junction box, which belongs to the technical field of junction boxes. The problems of how to conveniently open and close a junction box in the prior art and how to prevent mutual interference of different electronic instruments are solved. A junction box includes a flip cover and a box body, and further includes a cover plate. The cover plate is detachably connected to the box body to form a closed mounting chamber and a mounting slot; the cover plate is provided with a clamping hole; one end of the flip cover is rotatably connected to the box body; a clamping plate is provided at the other end of the flip cover; the clamping plate can be clamped in the clamping hole to enable the flip cover to close a notch of the mounting slot; and the clamping plate can also be separated from the clamping hole to open the mounting slot.

At present, a junction box mounted on a wall has a small internal space. If a socket or switch is directly mounted on the junction box, the junction box will be completely covered. As the number of cables in the junction box increases, the cables in the junction box are interspersed disorderly, and an enough space for threading cannot be provided. In addition, when the interior of the junction box is repaired or maintained, the switch or socket is required to be removed from the junction box, so repair and maintenance are difficult.

SUMMARY

The present disclosure aims to provide a junction box mounted to be flush with a wall surface and convenient for line repair to solve the following problems: Since a junction box that is mounted on a wall has a small internal space, if a socket or switch is directly mounted on the junction box, the entire junction box will be covered, and as a result, the junction box has a small space for threading and is inconvenient to repair and maintain.

In order to achieve the above objective, the present disclosure adopts the following technical solution: A junction box mounted to be flush with a wall surface and convenient for line repair includes a junction box body and a flip cover body; a top surface of one part of the junction box body sinks to form a step surface; the step surface extends to an edge of the junction box body; the flip cover body is hinged to a first end of the junction box body; the flip cover body is clamped on the junction box body; the flip cover body is fitted to the step surface; the flip cover body presses against a second end of the junction box body; a top surface of the other part of the junction box body is provided with a connector extending towards two sides; a plurality of threading holes running through the junction box body are formed in a side wall of the junction box body; the plurality of threading holes are located at the first end; two symmetrically disposed wire clamping plates are arranged in each threading hole; and the wire clamping plates are connected to the junction box body.

As a further description of the above-mentioned technical solution:

The junction box body and the flip cover body are integrated.

As a further description of the above-mentioned technical solution:

A fixture block is arranged on an inner wall of the junction box body; a fastener is arranged on a bottom surface of the flip cover body; and the fastener is fastened on the fixture block.

As a further description of the above-mentioned technical solution:

A limiting boss is arranged on the bottom surface of the flip cover body; and the limiting boss presses against the inner wall of the junction box body located at the first end.

As a further description of the above-mentioned technical solution:

The wire clamping plates are integrated with the junction box body.

As a further description of the above-mentioned technical solution:

A plurality of sawteeth are arranged on the wire clamping plates; and the sawteeth on the wire clamping plates located in the same threading hole are oppositely disposed.

As a further description of the above-mentioned technical solution:

An end part of the flip cover body facing to the second end is provide with a bent end that is upwards bent; a limiting rib is arranged on the inner wall of the junction box body; and the bent end presses against the limiting rib.

As a further description of the above-mentioned technical solution:

The second end is provided with a guide slope.

In summary, the above-mentioned technical solution is used, so that the present disclosure has the beneficial effects as follows.

1. In the present disclosure, by means of the design of a large-space junction box body, a space for mounting a switch or socket is reserved at a connector of the junction box body. Compared with a traditional junction box, the junction box additionally has a part of the space of the junction box body that is covered by the flip cover body, so that there is a large enough space for threading. Furthermore, the top surface of the flip cover body is in a state of overlapping the wall surface during mounting, which ensures a beautiful mounting effect.

2. In the present disclosure, since the junction box body and the flip cover body are integrated, and the flip cover body is clamped on the junction box body, the flip cover body can be quickly separated from the step surface. Therefore, the interior of the junction box body can be inspected without dismantling the switch or socket at the connector, which is convenient for repair and maintenance.

ILLUSTRATIONS IN THE DRAWINGS

1: junction box body; 2: flip cover body; 3: step surface; 4: first end; 5: second end; 6: connector; 7: threading hole; 8: wire clamping plate; 9: fixture block; 10: fastener; 11: limiting boss; 12: sawtooth; 13: bent end; 14: limiting rib; 15: guide slope.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, not all embodiments. Based on embodiments of the present disclosure, all other embodiments obtained by those of ordinary skill in the art without creative work shall fall within the scope of protection of the present disclosure.

Figure 1:
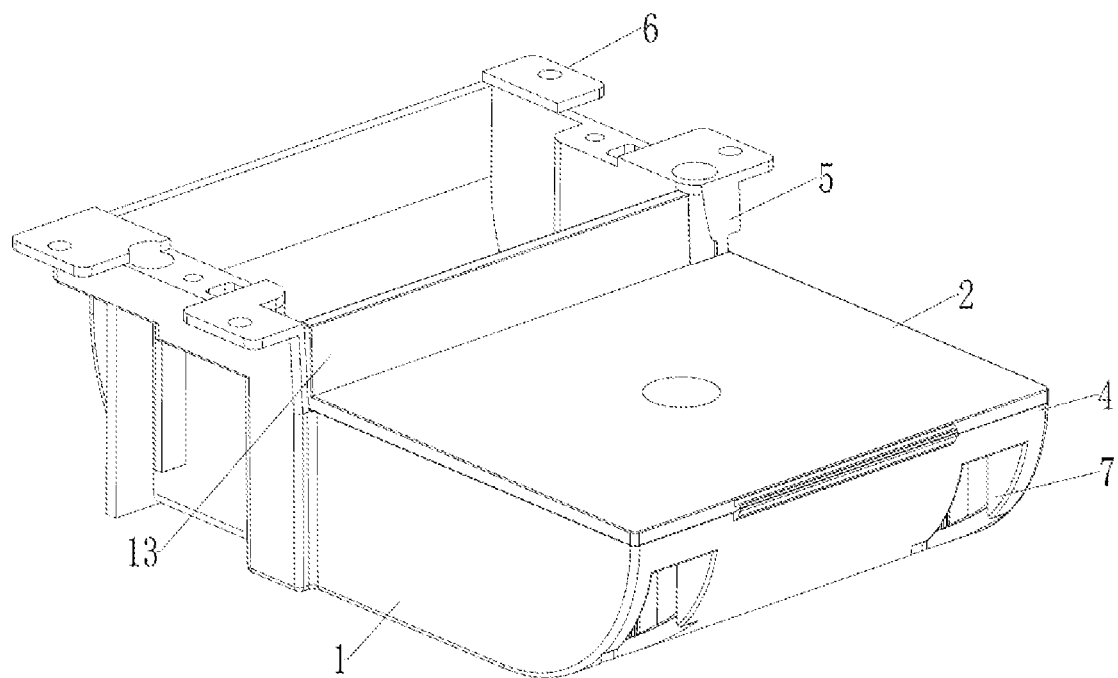
FIG. 1 is a schematic diagram I of an entire structure of a junction box mounted to be flush with a wall surface and convenient for line repair.
Figure 2:
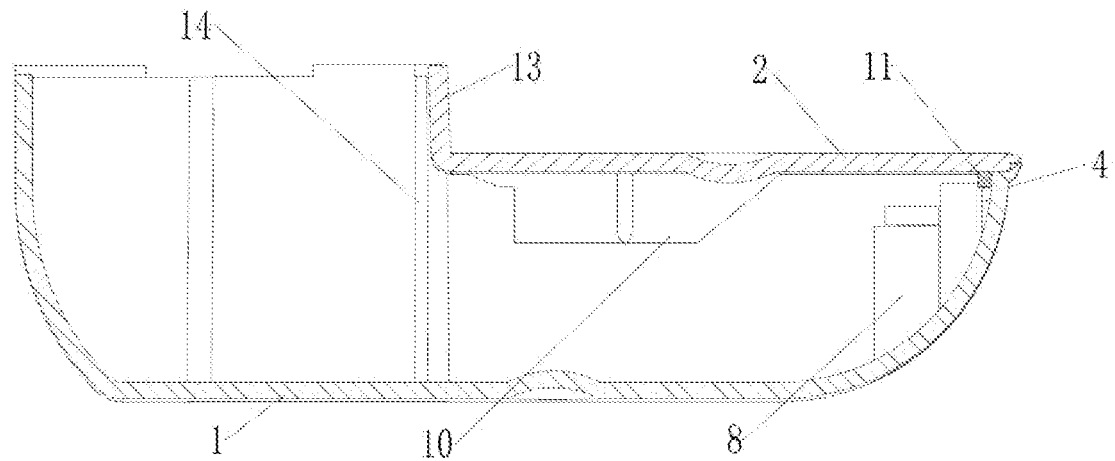
FIG. 2 is a sectional view of a junction box mounted to be flush with a wall surface and convenient for line repair.
Figure 3:
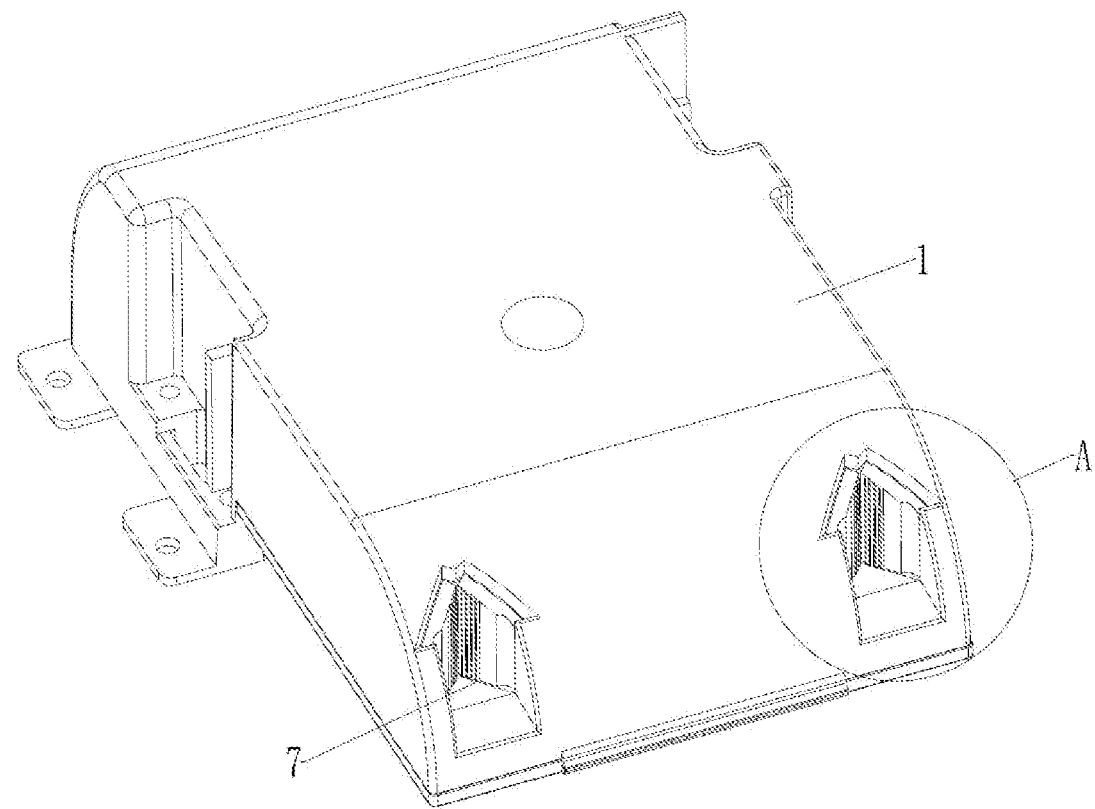
FIG. 3 is a schematic diagram I of an entire structure of a junction box mounted to be flush with a wall surface and convenient for line repair.
Figure 4:
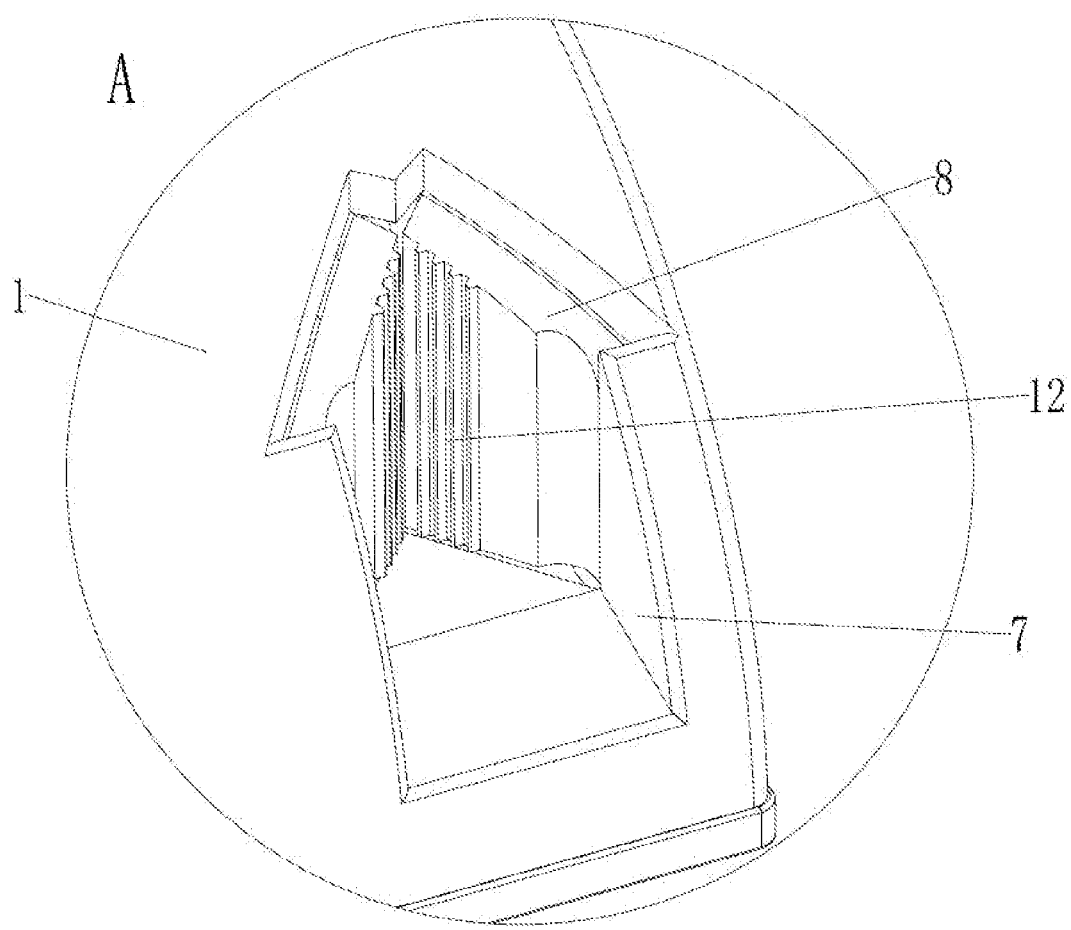
FIG. 4 is a partially enlarged diagram of the part A in FIG. 3.
Figure 5:
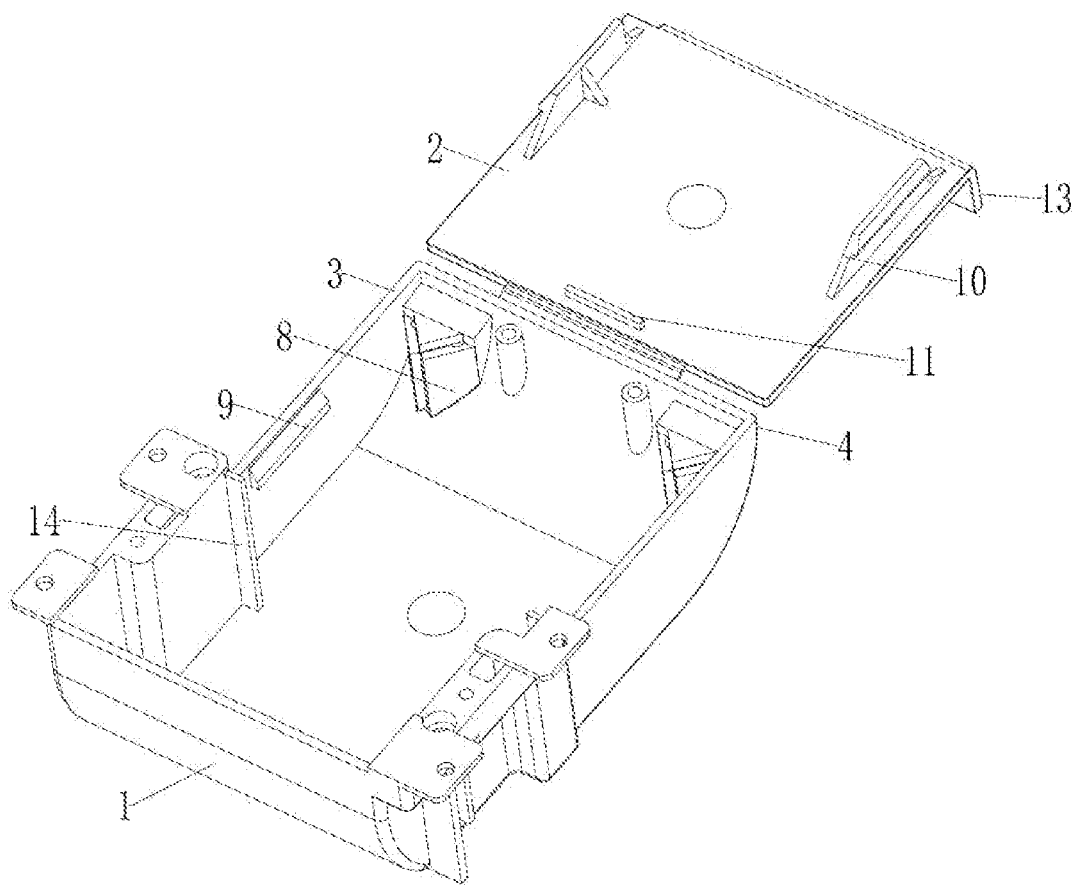
FIG. 5 is a reference diagram of a usage state of a junction box mounted to be flush with a wall surface and convenient for line repair.
Figure 6:
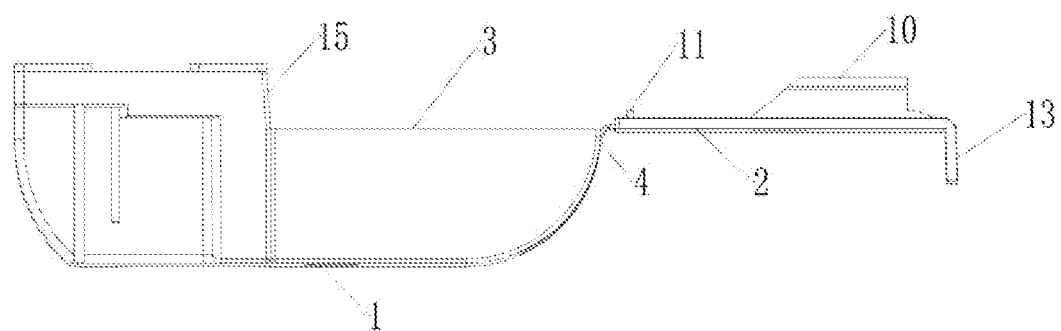
FIG. 6 is a side view of FIG. 5.

Referring to FIGS. 1-6, the present disclosure provides one technical solution: A junction box mounted to be flush with a wall surface and convenient for line repair includes a junction box body 1 and a flip cover body 2; a top surface of one part of the junction box body 1 sinks to form a step surface 3; the step surface 3 extends to an edge of the junction box body 1; the flip cover body 2 is hinged to a first end 4 of the junction box body 1; the flip cover body 2 is clamped on the junction box body 1; the flip cover body 2 is fitted to the step surface 3; the flip cover body 2 presses against a second end 5 of the junction box body 1; a top surface of the other part of the junction box body 1 is provided with a connector 6 extending towards two sides; a plurality of threading holes 7 running through the junction box body 1 are formed in a side wall of the junction box body 1; the plurality of threading holes 7 are located at the first end 4; two symmetrically disposed wire clamping plates 8 are arranged in each threading hole 7; and the wire clamping plates 8 are connected to the junction box body 1.

The junction box body 1 and the flip cover body 2 are integrated. A fixture block 9 is arranged on an inner wall of the junction box body 1; a fastener 10 is arranged on a bottom surface of the flip cover body 2; and the fastener 10 is fastened on the fixture block 9, thus improving the integrality of the junction box body 1. The fastener 10 on the flip cover body 2 is plugged into the fixture block 9, so that the flip cover body 2 can be firmly attached to the step surface 3 to cover the interior of the junction box body 1. When the fastener 10 on the flip cover body 2 is pulled off from the fixture block 9, the flip cover body 2 can be flipped to be separated from the step surface 3 to expose the interior of the junction box body 1, so that the interior condition of the junction box body 1 can be inspected without dismantling the switch or socket at the connector 6, which facilitates repair and maintenance. The fastener 10 has an elastic deformation function, so that it is convenient for the fastener 10 to be plugged into the fixture block 9 or separated from the fixture block 9 after the deformation.

A limiting boss 11 is arranged on the bottom surface of the flip cover body 2; and the limiting boss 11 presses against the inner wall of the junction box body 1 located at the first end 4 to achieve a limiting effect on a covering position of the flip cover body 2 on the step surface 3, so that the flip cover body 2 can be accurately fitted to the step surface 3 and cover the interior of the junction box body 1.

The wire clamping plates 8 are integrated with the junction box body 1, which is convenient for improving the integrality of the junction box body 1, so that there is no need to additionally mount wire clamping plates 8 during the mounting of the junction box body 1, and the junction box body 1 can have a wire clamping function to prevent cables from moving; and the wire clamping plates 8 have the characteristic of elastic deformation.

A plurality of sawteeth 12 are arranged on the wire clamping plates 8; and the sawteeth 12 on the wire clamping plates 8 located in the same threading hole 7 are oppositely disposed. The oppositely disposed sawteeth 12 clamp a cable passing through the threading hole 7 to restrain the movement of the cable, thus ensuring the mounting stability of the cable.

An end part of the flip cover body 2 facing to the second end 5 is provide with a bent end 13 that is upwards bent; a limiting rib 14 is arranged on the inner wall of the junction box body 1; and the bent end 13 presses against the limiting rib 14, so as to play a limiting role for the covering position of the flip cover body 2 at the step surface 3, so that the flip cover body 2 can be accurately fitted to the step surface 3 and cover the interior of the junction box body 1. At the same time, the bent end 13 covers the space of the junction box body 1 at the second end 5 to ensure that the internal space of the junction box body 1 cannot be seen from the second end 5 after the socket or switch has been mounted on the junction box body 1; and the beautiful mounting effect is guaranteed.

The second end 5 is provided with a guide slope 15 which has a guide effect on the flipping of the flip cover body 2 and is convenient for smooth clamping of the flip cover body 2.

The working principle is as follows: First, when the flip cover body 2 is fitted to the step surface 3, the junction box body 1 is mounted in a wall body; the top surface of the flip cover body 2 overlaps the wall surface; the connector 6 of the junction box body 1 protrudes from the wall surface; an end part of the cable is threaded into the junction box body 1 from the threading hole 7; the cable passes between the two wire clamping plates 8 in the threading hole 7; elastic deformation occurs in the wire clamping plates 8; and the sawteeth 12 on the wire clamping plates 8 firmly clamp the cable. Second, the bent end 13 is pinched and pulled; the fastener 10 falls off from the fixture block 9 under the action of an external force, and the flip cover body 2 is flipped to be separated from the step surface 3; the socket or switch is wired and mounted on the connector 6 of the junction box body 1; and the socket or switch covers the top surface of the junction box body 1. Then, the flip cover body 2 is flipped to be folded towards the step surface 3. The flip cover body 2 is in contact with the guide slope 15 when it is flipped to the second end 5. The guide slope 15 has a guide effect on the flip cover body 2, so that the flip cover body 2 presses against the second end 5. At this time, the flip cover body 2 starts to be fitted to the step surface 3; the limiting boss 11 slowly presses against the inner wall of the junction box body 1 located at the first end 4; and the bent end 13 presses against the limiting rib 14. Under the limiting action of the limiting rib 14 and the limiting boss 11, the flip cover body 2 accurately covers the junction box body 1, and the bent end 13 covers the space of the junction box body 1 at the second end 5, thus avoiding the interior of the junction box body 1 from being exposed and ensuring the beautiful mounting effect. Finally, without dismantling the switch or socket at the connector 6, the flip cover body 2 is flipped to be separated from the step surface 3, so as to expose the interior of the junction box body 1, and then the interior condition of the junction box body 1 can be inspected. Thus, it is convenient for repair and maintenance. After the repair and the maintenance are completed, the flip cover body 2 is flipped to be fitted to the step surface 3.

The above descriptions are only specific preferred implementation modes of the present disclosure, but the scope of protection of the present disclosure is not limited thereto. For any person skilled in the art, within the technical scope disclosed by the present disclosure, equivalent substitutions or changes made according to the technical solution of the present disclosure and an inventive idea of the present disclosure shall all fall within the scope of protection of the present disclosure.

What is claimed is:

1. A junction box mounted to be flush with a wall surface and convenient for line repair, comprising a junction box body (1) and a flip cover body (2), wherein a top surface of one part of the junction box body (1) sinks to form a step surface (3); the step surface (3) extends to an edge of the junction box body (1); the flip cover body (2) is hinged to a first end (4) of the junction box body (1); the flip cover body (2) is clamped on the junction box body (1); the flip cover body (2) is fitted to the step surface (3); the flip cover body (2) presses against a second end (5) of the junction box body (1); a top surface of the other part of the junction box body (1) is provided with a connector (6) extending towards two sides; a plurality of threading holes (7) running through the junction box body (1) are formed in a side wall of the junction box body (1); the plurality of threading holes (7) are located at the first end (4); two symmetrically disposed wire clamping plates (8) are arranged in each threading hole (7); and the wire clamping plates (8) are connected to the junction box body (1); wherein the second end (5) is provided with a guide slope (15);

wherein an end part of the flip cover body (2) facing to the second end (5) is provide with a bent end (13) that is upwards bent; a limiting rib (14) is arranged on the inner wall of the junction box body (1); and the bent end (13) presses against the limiting rib (14).

2. The junction box mounted to be flush with the wall surface and convenient for line repair according to claim 1, wherein the junction box body (1) and the flip cover body (2) are integrated.

3. The junction box mounted to be flush with the wall surface and convenient for line repair according to claim 1, wherein a fixture block (9) is arranged on an inner wall of the junction box body (1); a fastener (10) is arranged on a bottom surface of the flip cover body (2); and the fastener (10) is fastened on the fixture block (9).

4. The junction box mounted to be flush with the wall surface and convenient for line repair according to claim 1, wherein a limiting boss (11) is arranged on the bottom surface of the flip cover body (2); and the limiting boss (11) presses against the inner wall of the junction box body (1) located at the first end (4).

5. The junction box mounted to be flush with the wall surface and convenient for line repair according to claim 1, wherein the wire clamping plates (8) are integrated with the junction box body (1).

6. The junction box mounted to be flush with the wall surface and convenient for line repair according to claim 1, wherein a plurality of sawteeth (12) are arranged on the wire clamping plates (8); and the sawteeth (12) on the wire clamping plates (8) located in the same threading hole (7) are oppositely disposed.

\* \* \* \* \*